United States Patent [19]

Pirkey et al.

[11] Patent Number: 4,517,942

[45] Date of Patent: May 21, 1985

[54] OVERRIDE SPEED CONTROL

[75] Inventors: Robert J. Pirkey, New Holstein; Stephen D. Ditter, Fond du Lac, both of Wis.

[73] Assignee: Tecumseh Products Company, Tecumseh, Mich.

[21] Appl. No.: 637,412

[22] Filed: Aug. 3, 1984

[51] Int. Cl.³ .............................................. F02D 31/00
[52] U.S. Cl. ................................ 123/376; 123/179 G
[58] Field of Search ............... 123/376, 396, 398, 400, 123/403, 179 G

[56] References Cited

U.S. PATENT DOCUMENTS

| | | | |
|---|---|---|---|
| 2,236,803 | 4/1941 | McCormik | 123/376 |
| 2,635,595 | 4/1953 | Raleigh | 123/403 |
| 2,837,070 | 6/1958 | Agar | 123/376 |
| 3,149,618 | 9/1964 | Catterson | 123/376 |
| 3,276,439 | 10/1966 | Reichenbach | 123/376 |
| 3,749,069 | 7/1973 | Reese | 123/179 G |

Primary Examiner—William A. Cuchlinski, Jr.
Attorney, Agent, or Firm—Albert L. Jeffers; Anthony Niewyk

[57] ABSTRACT

An override speed control for the carburetor of a small internal combustion engine such as used with lawnmowers. The control for preventing changes in speed of the engine while a speed control lever is moved into its choke position comprises a speed control lever, an intermediate or enabling lever and a throttle control lever. The three levers are interconnected by means of extension springs one each of which connects the intermediate lever respectively to the speed control lever and the governor lever. The speed control lever in the last increment of movement of its control range actuates the choke valve of the carburetor. The governor lever controls the throttle valve of the carburetor. A governor driven by the engine and responsive to engine speed is connected to the governor lever. Adjustable stop means are provided on the intermediate lever to positively stop movement of the intermediate lever during the last increment of movement of the speed control lever. The control system maintains a constant engine speed for any setting of the speed control lever when the speed control lever is in its last increment of movement. During this increment of movement of the control lever the intermediate lever is unresponsive to movement of the speed control lever, the speed of the engine will be maintained at the high speed setting so that the engine speed will remain constant irrespective of the choking action of the speed control lever. The governor maintains control over the engine speed under varying loading conditions from the idle setting through the choke setting of the speed control lever. Adjustable positive stop means are provided on the intermediate lever for defining the idle setting.

14 Claims, 4 Drawing Figures

OVERRIDE SPEED CONTROL

BACKGROUND OF THE INVENTION

The present invention relates to carburetor control systems for internal combustion engines and in particular to such control systems for small internal combustion engines such as those used with lawnmowers and the like. It is desirable that the speed of internal combustion engines is controlled so that the speed of the engine remains relatively constant under different loading conditions. For instance, in the use of a lawnmower which is powered by an internal combustion engine it is desirable that the selected speed of the engine remain relatively constant despite various loading conditions. Thus, as the lawnmower encounters tall grass which loads the engine down or relatively short grass under which condition the engine has to do little work, the lawnmower speed which has been selected by the operator should remain constant.

In the conventional designs of combustion engines speed controls have been provided which control the carburetor to provide constant engine speed for different loading conditions. Such carburetors are normally provided with a choke valve and throttle valve and have a governor interconnected with the speed control lever and the throttle and choke valves for maintaining constant speeds. The governor conventionally consists of a device which is sensitive to engine speed and has an output shaft or lever which is interconnected with the speed control lever and the throttle valve to maintain constant engine speed.

The speed control lever commonly consists of two parts of which one part is connected by means of a control cable to a manually operable control lever and the other part of which is connected to the governor lever. The two parts cooperate to control the choke and throttle valves and are generally interconnected with an adjustment screw by which the high speed of the engine is adjusted. The control lever has an idle position, a start/run position and a choke position. The control lever is connected to the choke valve so that in the choke position the air flow to the engine is reduced and a rich fuel mixture is admitted to the engine.

By means of such type of controls the speed of the engine will remain relatively constant for any of the settings of the control lever because of the interaction of the governor with the throttle valve and the control lever.

Optimum operation of the devices powered by such internal combustion engines requires that the speed of the engine is adjusted to be optimum for the high speed setting of the control lever. A problem with the prior art control systems has been that, when the control lever is moved from the high speed position into the choke position, the interconnection of the control lever with the governor cause the engine to run at a higher speed in the choke setting. This is undesirable since at such higher speed the engine will not operate at its optimum performance level. In addition, the movement of the control lever from the high speed setting to the choke setting may be inadvertent because of improper setting of the control lever by the operator. Thus, engine performance will deteriorate and the implement powered by the engine will not operate at its optimum performance level.

Another problem with the prior art control systems has been that the range of control of the engine speed has been rather limited. Thus, engine speed is generally not controlled at the idle setting of the control lever. This is undesirable since it is possible that the operator will inadvertently load the engine while it is idling and thereby kill the engine so that it must be restarted.

SUMMARY OF THE INVENTION

The present invention overcomes the disadvantages of the prior art speed controls by providing an improved speed control. One feature of the speed control of the present invention, in one form thereof, is the provision of a carburetor having an air fuel mixture conduit. A choke valve and a throttle valve are positioned in said conduit. A governor, driven by the engine and responsive to engine speed is operatively connected to the throttle valve to position the throttle valve in accordance with engine speed to maintain a relatively constant engine speed under varying loading conditions. A unitary control lever for controlling the engine speed is operatively connected to the choke valve and the governor and has two operating ranges. The choke is fully open in the first operating range and is only partially open or closed in the second operating range. An enabling means is operatively connected to the control lever for enabling the control lever in the first range to control the engine speed and for disabling the control lever from controlling the engine speed in the second range.

In accord with another aspect of the invention there is provided a carburetor for an internal combustion engine having a body and an air fuel mixture passageway through said body. A control system for the carburetor comprises: a choke valve disposed in the passageway for controlling the flow of air; a throttle valve disposed in the passageway for controlling the flow of the air fuel mixture; a control lever for controlling engine speed, pivotally mounted above the carburetor body and operatively connected to the choke valve and throttle valve and having first and second operating ranges; governor means driven by the engine and responsive to engine speed, and having an output lever pivotally mounted on the body, operatively connected to the throttle valve for maintaining the engine speed constant for all settings of the control lever; and intermediate lever operatively connected to the control and governor output levers for enabling the control lever to control the engine speed in the first operating range and preventing the control lever from controlling engine speed in the second operating range.

In yet another aspect of the present invention a carburetor control system is provided wherein a unitary control lever controls engine speed. A governor lever is provided whose position varies with engine speed and an intermediate lever is provided which is pivotally mounted and is connected by two spring means respectively connected to the control lever and the governor lever. The intermediate lever is pivotable through an arc of predetermined length which corresponds to a first operating range of the control lever. The control lever is operable through a further increment of operating range wherein the intermediate lever remains in a fixed position and the governor lever, by its interaction with the intermediate lever, also remains unaffected by further incremental movement of the control lever. In the incremental range of operation of the control lever the choke is partially or entirely closed but the speed of the engine remains unaffected because of the fixed positions of the governor and intermediate levers. The length of the arc of operation of the intermediate lever can be adjusted by means of two adjusting screws which abut with a portion of the cylinder block.

It is an object of the invention to provide a control system for a carburetor wherein adjustment of the control lever from the high speed setting to the choke setting has no effect on the speed of the engine.

It is another object of the invention to provide a control system for a carburetor wherein a wide range of governor control over the engine speed is provided.

It is yet another object of the invention to provide a carburetor control system for an engine wherein the governor controls the entire range of speeds of the engine from high speed through idle speed.

It is yet another object of the invention to provide a carburetor control system which is very simple, reliable and easy to manufacture and operate.

BRIEF DESCRIPTION OF THE DRAWINGS

The above-mentioned and other features and objects of this invention, and the manner of attaining them, will become more apparent and the invention itself will be better understood by reference to the following description of an embodiment of the invention taken in conjunction with the accompanying drawings, wherein.

DETAILED DESCRIPTION OF A PREFERRED EMBODIMENT

Figure 1:
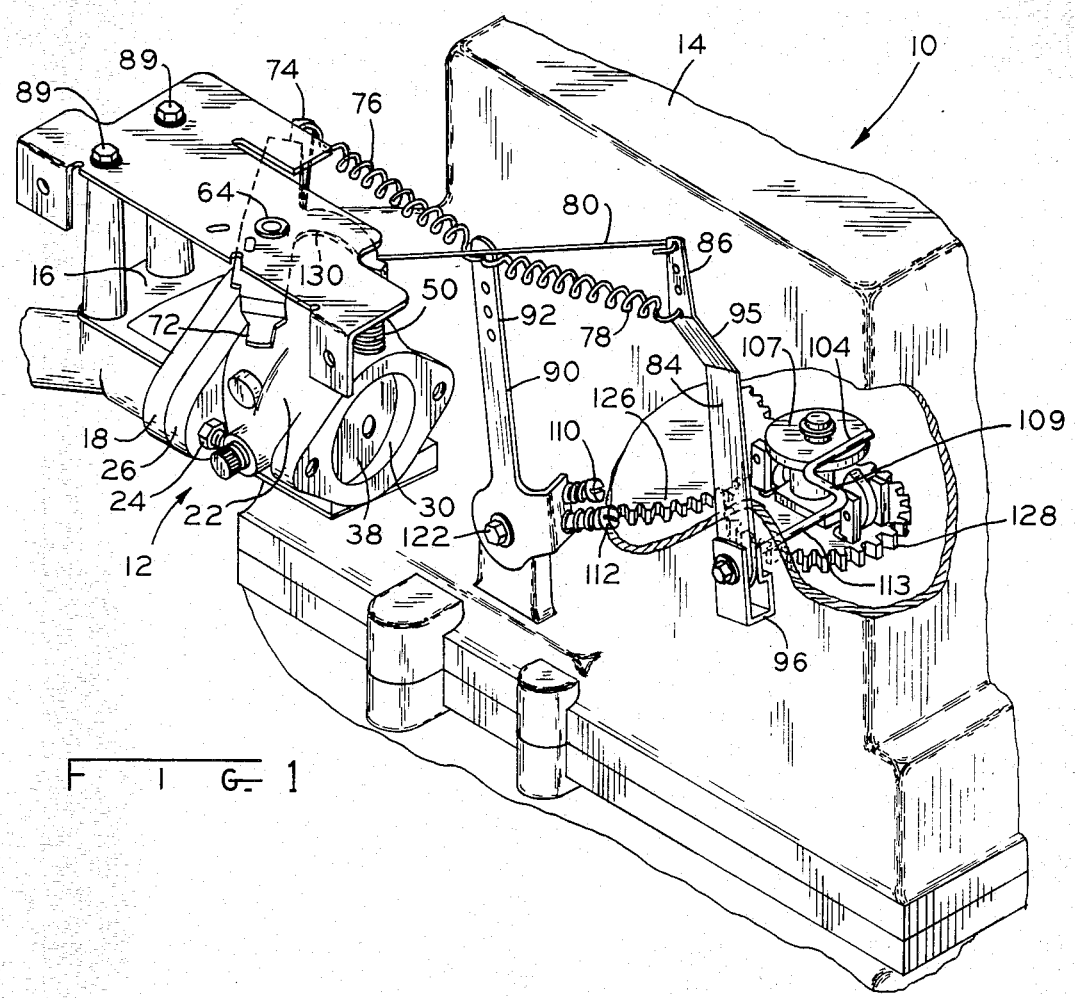
FIG. 1 is a fragmentary perspective view of a vertical shaft, single cylinder lawnmower engine having the improved speed control system of the present invention embodied therein, portions being broken away and the system being shown with the throttle in the run position.

Referring now in more detail to the drawings:

FIG. 1 shows a portion of an engine 10 having a crankcase 14, an intake manifold 16 with a carburetor mounting flange 18. By way of illustration and not by way of limitation, engine 10 as shown herein, is a single cylinder, air cooled vertical crankshaft engine of the type adapted for mounting on the deck of a rotary lawnmower. A carburetor 12 having a carburetor body 22 is attached to manifold 16 by a pair of fasteners 24 which secure a flange 26 at the outlet end of body 22 to flange 18. A gasket (not shown) seals the connection between flanges 18 and 26.

Figure 4:
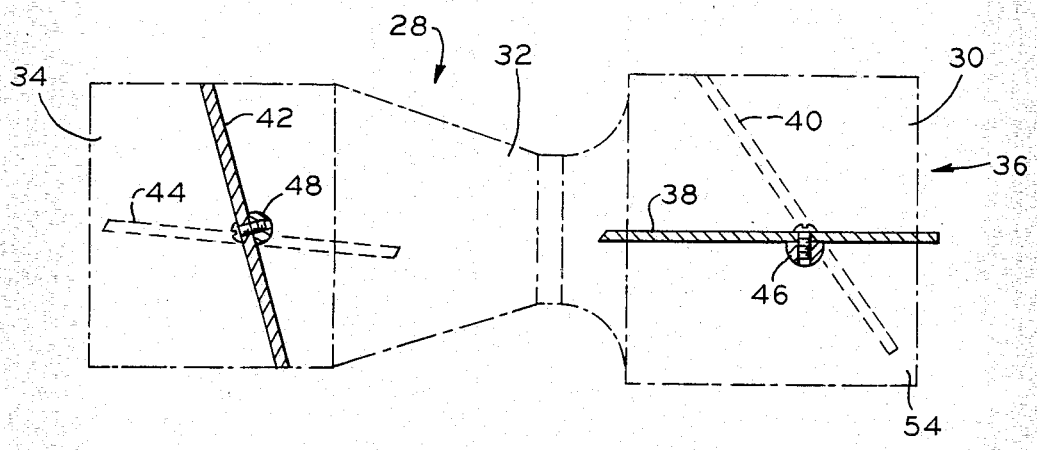
FIG. 4 is an enlarged horizontal sectional view taken along lines 4—4 in FIG. 3 and showing the operating positions of the throttle and choke valves.

As illustrated in FIG. 4, an air fuel mixture conduit 28 extends through body 22. Conduit 28 includes an air intake opening 30 at the near end of body 22 as viewed in FIG. 1, a venturi portion 32 and a discharge outlet 34 at the other end of body 22. In the illustrated embodiment, carburetor 12 is oriented in a horizontal position so that the direction of fluid flow as indicated by arrow 36 in FIG. 4 through conduit 28 is horizontal. The air intake opening 30 is covered by a conventional air filter (not shown).

Carburetor 12 further includes a choke plate 38 positioned within conduit 28 adjacent to intake opening 30. Choke plate 38 is fastened to a choke shaft 46 which is mounted in conduit 28 to support the choke plate for movement about a vertical axis as illustrated in dotted lines in FIG. 3. Thus, the choke plate 38 comprises a valve means for varying the amount of air flowing through conduit 28. Plate 38 is a truncated ellipse having an unbalanced mounting on shaft 46; i.e., its center of mass is to the left of shaft 46 as viewed in FIG. 4 so that induction air pressure tends to pivot the plate counter-clockwise to the solid "full" open position thereof shown in FIG. 4. A bias spring 50 illustrated in FIG. 3 also biases choke plate 38 into the open position. With choke plate 38 in the closed position shown by broken lines 40 in FIG. 4, the elliptically contured edge abuts the wall of conduit 28 and the truncated edge cooperates with the wall to define a restricted opening 54 to restrict air intake into carburetor 12.

A throttle plate 42 is positioned within conduit 28 adjacent discharge outlet 34. Throttle plate 42 is attached to a throttle shaft 48 which supports plate 42 for movement about a vertical axis shown in dotted outline in FIG. 3. Throttle plate 42 is rotatable counter-clockwise as viewed in FIG. 4 from its "stop" (full throttling) position to a full open position 44 shown in dotted lines in FIG. 4. A bias spring 52 biases shaft 48 clockwise as viewed in FIG. 4 to urge throttle plate 42 toward its closed position.

Figure 2:
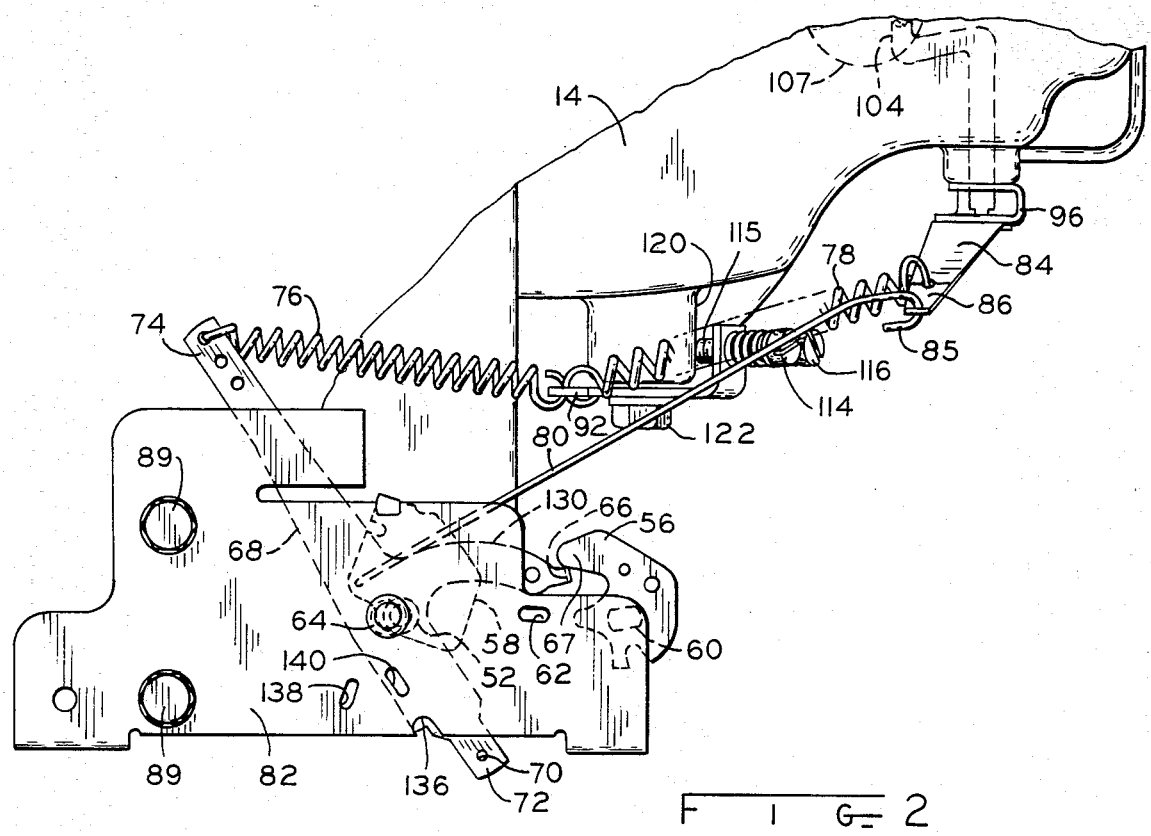
FIG. 2 is a top plan view of the control system of FIG. 1 with the speed control lever in the choke position.

The choke shaft 46 has a rectangular upper portion 64 which engages and is secured to a choke control plate 56 as best illustrated in FIG. 2. The choke control plate 56 is engaged with a choke tang portion 66 of speed control lever 68 as shown in FIG. 2. In the illustrated position of the choke control plate 56 the choke valve is in the closed position as illustrated by dotted lines 40 in FIG. 4. As further illustrated in FIG. 2, the speed control lever 68 is shown in its choke position to contact the choke control plate 56. As also illustrated in FIG. 2, a throttle control plate 58 is secured to throttle shaft 48. Throttle control plate 58 is also connected to a throttle control rod 80 by means of a bent over portion 81 at the end of the throttle control rod 80. The bent over portion 81 is threaded through a hole in the throttle control plate 58 as shown in both FIGS. 2 and 3. The other end of throttle control rod 80 is connected with an upper portion 86 of governor lever 84. A bent over portion 85 of the throttle control rod 80 is threaded through a hole in portion 86 of governor lever 84. Governor lever 84 is also connected by means of a spring 78 to an intermediate lever 90. Spring 78 is an extension spring and has a one end bent over portion engaged with a hole in upper portion 86 of governor lever 84. The other end of spring 78 has a bent over portion which engages with a hole in upper portion 92 of intermediate lever 90. Intermediate lever 90 is also connected to speed control lever 68 by means of a second extension spring 76. A bent over portion at one end of spring 76 engages with a hole in the upper end 92 of intermediate lever 90. The other end of spring 76 has a bent over portion which engages with an upper end 74 as viewed in FIG. 2 of speed control lever 68. Speed control lever 68 is a unitary lever and is mounted pivotally to bracket 82 by means of a rivet 64. An end portion 72 of lever 68 opposite end 74 has a hole 70 therein which engages with a control cable (not shown). The control cable is connected with a speed control lever of the lawnmower (not shown) in the usual manner. The control cable preferably consists of a Bowden cable.

Control lever 68 has a detent portion therein which is engagable with apertures 138 and 140 in bracket 82.

Figure 3:
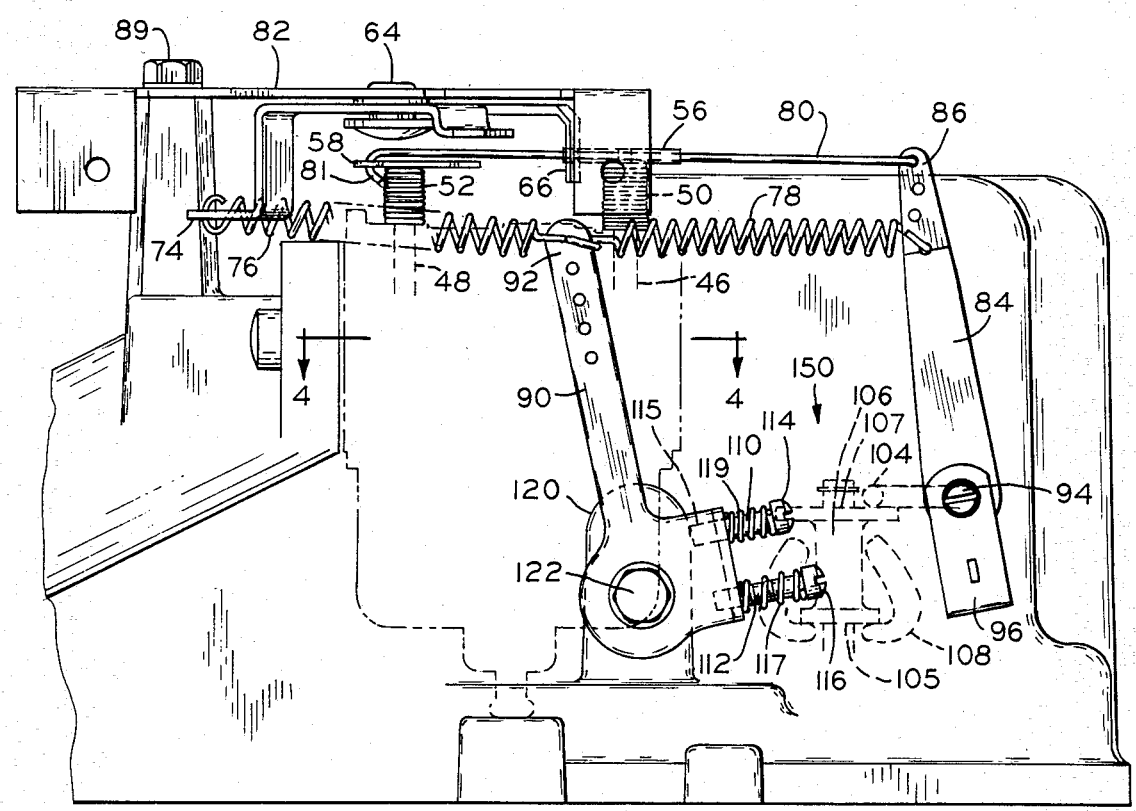
FIG. 3 is a front elevational view of the control system of FIG. 2.

Bracket 82 is attached to the intake manifold by means of two bolts 89. Aperture 138, when it engages the detent portion of lever 68, defines the idle speed position of control lever 68 and aperture 140, when it engages the detent in control lever 68, defines the high speed or run position of lever 68. Governor lever 84 is secured to a governor output shaft 104 by means of a threaded screw 94 and a bracket 96. The governor 150 shown in FIGS. 1 and 3 consist of a conventional spool member 106 having a flange 105 which is engaged by flyweights 108. The flyweights and spool 106 rotate together with a gear 128 which is driven in a well-known manner by any speed responsive engine member such as engine cam shaft timing gear 126 shown in FIG. 1. The flyweights 108 are pivotally mounted and, as the engine increases in speed and gear 128 revolves at higher rotational speed, the portions of the flyweights 108 engaging the flange 105 will move to a higher position as viewed in FIG. 3. The top flange 107 of the spool 106 engages a portion 104 of an output shaft 109 of the governor. The portion 113 of the output shaft of the governor will rotate about its longitudinal axis as the portion 104 changes in vertical position as shown in FIG. 3. Thus, as the engine speed changes, the rotational orientation of portion 113 of the governor output shaft will change. Since portion 113 of output shaft 109 is secured to governor lever 84, the governor lever 84 will pivot about the axis of portion 113 of governor output shaft 109. Thus, the position of governor output lever 84 varies as a function of engine speed. Intermediate lever 90 pivots about an axis 88. Intermediate lever 90 is fastened pivotally at its pivot point 88 by means of a threaded bolt 122 as shown in FIG. 2.

The extension spring 76 is of heavier construction than extension spring 78. By moving lever 68 in a counter-clockwise direction around its pivot point 64 the spring 78 is extended and when it becomes fully extended spring 76 is extended. The rotation of portion 113 of governor shaft 109 with increasing engine speed is clockwise. Therefore there are two opposing forces acting upon spring 78 that tend to extend the spring. The first force is generated by the counter-clockwise pivoting of lever 68. The second force is the clockwise rotational force generated by the action of the governor upon its output shaft which is transmitted to lever 84. The position of lever 84 is a function of both of these forces. Governor lever 84, as explained hereinabove, is connected to throttle control rod 80 which in turn is connected to throttle control plate 58. Therefore, the position of the throttle plate 42 is a function both of the setting of the speed control lever 68 and the engine speed by way of governor 150.

Assuming that the speed control lever 68 has been put in the high speed position and its detent engages the aperture 140, the throttle plate should be in an open position intermediate the solid line and dotted line positions 42 and 44 illustrated in FIG. 4. Concurrently therewith, the action of spring 50 upon the choke plate 38 causes choke plate 38 to be in the wide open position as illustrated by the solid line position in FIG. 4. Assuming that the engine is running, the engine will run at its high speed. If the engine is now loaded down, for example, by moving the lawnmower through very tall grass, the engine will load down and will tend to slow down therefore tending to cause the flyweights 108 to pull in and the output portion 113 of governor output shaft 109 to rotate counter-clockwise. This counter-clockwise rotation of output shaft portion 113 will tend to cause a counter-clockwise rotation of governor lever 84 thereby causing control rod 80 to rotate throttle control plate 58 counter-clockwise as shown in FIG. 2, opening the throttle plate and allowing the engine speed to increase. As the engine speed increases, it will tend to rotate governor output shaft portion 113 counter-clockwise, thereby rotating governor output lever 84 clockwise and counterbalancing the force of spring 76 and 78 and establishing a new position of lever 84 and a new balance point for the control system.

Thus, for any speed setting of the speed control lever 68 the governor will maintain the output speed of the engine relatively constant at the selected speed under varying load conditions.

As best shown in FIG. 3, two adjustment screws 110 and 112 are provided on a bottom portion 115 of intermediate lever 90. These screws are threadedly received in this portion and engage compression springs 117 and 119, which maintain the screws under constant tension so that they will not rotate due to vibrations of the engine and will maintain their selected positions. The one ends of the screws are engagable with an upstanding portion 120 of the engine housing. As the lever 90 is turned counterclockwise about its pivot point 88, the screw 110 will engage with member 120 and positively prevent any further counterclockwise movement of lever 90. Similarly, as lever 90 is rotated clockwise about pivot point 88, screw 112 will positively stop lever 90 from further rotation at the preselected point where the screw 112 engages member 120. Screw 110 determines the high speed setting of the engine. Screw 112 determines the idle speed setting of the engine. Thus, as the detent on speed control lever 68 engages with the aperture 140 thereby defining the high speed position of lever 68, screw 110 is adjusted to permit the engine to operate at its optimum high speed for optimum performance of the implement powered by the engine. Similarly, the idle screw 112 is adjusted to the proper idling speed of the engine when the detent in speed control lever 68 engages aperture 138.

It can readily be seen that as screw 110 bottoms out against portion 120 any further counter-clockwise rotation of speed control lever 68 will not cause further rotation of lever 90 or lever 84. Any further counter-clockwise rotation of lever 68 will extend only spring 76. Thus, as the screw 110 bottoms out against portion 120, control over the speed of the engine is exercised only by the governor by way of its output shaft 109 and lever 84. Therefore, the speed of the engine will tend to remain constant at the high speed setting once screw 110 has bottomed out against portion 120. It can also be seen by referring to FIGS. 2 and 3 that any further rotation of speed control lever 68 will cause closing of the choke by means of the action of the choke tang 66 of control lever 68 on choke control plate 56. It is therefore apparent that choking of the carburetor by means of the control lever 68 will have no effect on the speed of the engine as the governor will maintain the high speed to which the engine has been adjusted in its high speed setting.

When the intermediate lever 90 is allowed to rotate clockwise to the idle position by rotating speed control lever 68 so that its detent engages idling aperture 138, the governor maintains control over the idling speed of the engine by means of governor lever 84. In this position of speed control lever 68, choke valve 38 will be in its wide open position and choke control plate 56 will rotate until its portion 67 engages detent 62. The wide control range of the governor over the engine speeds from idling through high speed is made possible by the use of a relatively weak spring 78 in combination with a relatively strong spring 76 and the use of the intermediate lever 90.

What has therefore been shown is a control system for the carburetor of an internal combustion engine wherein the speed control lever 68 has two operating ranges. In its speed control operating range the position of the control lever 68 determines the speed at which the engine will run by interaction of the spring forces of springs 76, 78 and the rotational force of the governor output control shaft 104. However, in the second portion of the operating range of speed control lever 68, the intermediate lever 90 in combination with its adjustment screw 110 will disable the speed control lever 68 from exercising further control over governor lever 84. In this second operating range speed control lever 68 exercises control only over the position of the choke valve and will operate to hold the choke valve from the full open to the full closed position depending upon the exact position of control lever 68. The carburetor parts are proportioned in such a way that the choke setting portion of the operating range of lever 68 in the preferred embodiment is only a small increment of the total operating range of movement of lever 68. The parts are furthermore so proportioned that choking action will begin almost immediately upon movement of the speed control lever past the high speed position.

An advantage of the present design is that inadvertent adjustment of the speed control lever 68 to a choke position will not result in a higher and therefore nonoptimum speed of the engine. The speed that the engine will operate at for any position of the speed control lever 68 beyond the high speed position is the high speed for which the engine has been adjusted to operate optimumly.

What has also been disclosed is a control system for a carburetor wherein the total range of control by the governor over the engine speed consists of the entire range from engine idle to engine high speed.

What has further been disclosed is a control system for a carburetor wherein an enabling device 90 enables the speed control lever 68, by its position, to exercise control over the engine speed, the engine speed being maintained constant for the setting of the speed control lever by means of the governor. The enabling device 90 disables the speed control lever from exercising further control over the speed in the last increment of movement of the control lever 68, and the engine speed is maintained constant at the high speed setting during the last increment of movement of lever 68.

While this invention has been described as having a preferred design, it will be understood that it is capable of further modification. This application is therefore intended to cover any variations, uses, or adaptations of the invention following the general principles thereof and including such departures from the present disclosure as come within known or customary practice in the art to which this invention pertains and fall within the limits of the appended claims.

What is claimed is:

1. In a carburetor for an internal combustion engine having a body and an air fuel mixture conduit:
   a choke valve in said conduit adjustable between open and closed positions for controlling the flow of air;
   a throttle valve in said conduit downstream from said choke valve for controlling the flow of said air fuel mixture;
   governor means mounted on said engine and driven thereby and responsive to engine speed, said governor means operatively connected to said throttle valve for adjusting said throttle valve in accordance with engine speed;
   a control lever operably mounted on said body for selecting the engine speed and operatively connected to said choke valve, said lever positionable through first and second operating ranges, said choke being fully opened in said first operating range and said choke being at least partially closed in said second operating range;
   enabling means operatively connected to said control lever and said governor means for enabling said control lever to select the engine speed in said first operating range and for disabling said control lever from selecting the engine speed in said second operating range.

2. The carburetor of claim 1 wherein said first operating range includes an idle operating position and a high speed operating position, and said governor means is effective to maintain the selected engine speed for all selection positions of said control lever in said first operating range and to maintain the highest selectable engine speed when the control lever is in said second operating range.

3. The carburetor of claim 1 wherein said enabling means comprises an intermediate lever responsive to movement of said control lever in said first operating range for movement to a position corresponding to each selected position of said control lever, said intermediate lever being unresponsive to movement of said control lever in said second operating range, whereby said engine speed is maintained constant throughout said second operating range.

4. The carburetor of claim 3 wherein said control lever is a unitary lever and said intermediate lever has stop means operatively connected thereto for maintaining said lever in a fixed position throughout said second operating range of said control lever.

5. The carburetor of claim 3 including stop means operatively connected to said intermediate lever and adjustable to determine the lowest and highest selectable engine speeds in said first range and wherein said governor means maintains the selected engine speed for all selected positions of said control lever in said first operating range.

6. The carburetor of claim 1 wherein said enabling means comprises:
   an enabling lever mounted on said body and positionable through a range of operating positions, each of said operating positions corresponding to a position of said control lever in said first operating range;
   first spring means connected to said control lever and said intermediate lever;
   second spring means connected to said governor means and said intermediate lever;
   stop means operatively connected to said enabling lever for limiting movement of said enabling lever to said range of operating positions, whereby said governor means maintains the engine speed constant throughout said second operating range of said control lever.

7. The carburetor of claim 1 wherein the control lever comprises a pivotally mounted unitary lever and said first and second operating ranges comprise pivotal movement of said lever through a predetermined arc;

said enabling means comprising an intermediate lever pivotably mounted to said body;

said governor means comprising an output shaft mounted for rotation about its axis, and a lever secured to said output shaft for pivotal movement about said shaft axis;

first and second spring means connected to said intermediate lever and to said control lever and governor lever respectively, for enabling said control lever to bias said intermediate and governor levers to selected positions whereby desired engine speed is selected;

stop means operatively connected to said intermediate lever for preventing pivotal movement of said intermediate lever in response to movement of said control lever in said second operating range and said engine speed is maintained constant in said second operating range.

8. The carburetor of claim 1 wherein said enabling means comprises an intermediate lever mounted on said body;

a first extension spring connecting said control lever and said intermediate lever;

a second extension spring connecting said governor means and said intermediate lever;

said first spring means extensible only after said second spring means is fully extended when said control lever is positioned through its first operating range.

9. In a carburetor for an internal combustion engine having a body and an air fuel mixture passageway through said body, a control system comprising:

a choke valve disposed in said passageway for controlling the flow of air;

a throttle valve disposed in said passageway for controlling the flow of said air fuel mixture to vary the engine speed;

a control lever for selecting engine speed, movably mounted on the carburetor body and having a range of movement and operatively connected to said choke valve during a portion of its range for adjusting said valve between open and closed positions;

governor means, driven by said engine and having a movable output shaft, whose position varies in response to changes in engine speed, for providing an indication of engine speed;

connecting means for coupling said throttle valve to said governor output shaft, and for adjusting said throttle valve in response to changes in engine speed, whereby the engine speed is maintained constant for all selected portions of said control lever;

intermediate lever means, operatively connected to said control lever and said governor output shaft respectively for enabling said control lever to select engine speed as said control lever is moved through its range of movement and for disabling said control lever from selecting engine speed during the last increment of its range.

10. The carburetor of claim 9 wherein said intermediate lever means comprises a lever pivotally mounted on said carburetor body;

a first spring connected at its respective outer ends to said control lever and said intermediate lever respectively;

a second spring connected at its respective outer ends to said governor lever and said intermediate lever respectively;

and wherein the force for extending said first spring means is greater than the force for extending said second spring means.

11. The carburetor of claim 9 wherein stop means is operatively connected to said intermediate lever means for preventing movement of said intermediate lever for the last increment of movement of said control lever, and wherein said choke valve is adjusted during the last increment of movement of the control lever.

12. The carburetor of claim 9 wherein the control lever is unitary and is pivotally mounted for pivotal movement through an arc and wherein the engine speed is variable from idle to high speed.

13. The carburetor of claim 9 wherein adjustable stop means is operatively connected to said intermediate lever means, for adjusting the highest selectable engine speed and the idle engine speed.

14. A method for controlling the speed of an internal combustion engine having a governor means driven by the engine, and a carburetor with an air fuel mixture passage therein, a choke valve and throttle valve disposed in said passage for controlling the flow of air fuel mixture therethrough comprising:

selecting the speed of the engine with a control lever, said control lever moveable through a range of positions and operatively connected to said throttle valve and said choke valve;

maintaining the selected engine speed under varying loading conditions of said engine through all but the last increment of movement of said control lever;

maintaining the engine speed fixed for all positions of said control lever in the last increment of movement of said operating range by disabling control of said control lever over said throttle valve while permitting adjustment of said choke valve by said control lever.

* * * * *